US011287760B1

(12) United States Patent
Takada

(10) Patent No.: US 11,287,760 B1

(45) Date of Patent: Mar. 29, 2022

(54) IMAGE FORMING APPARATUS WITH VARIABLE LIGHT EMISSION INTENTSITY AND COMPUTER-READABLE NONVOLATILE RECORDING MEDIUM THEREFOR

(71) Applicant: TOSHIBA TEC KABUSHIKI KAISHA, Tokyo (JP)

(72) Inventor: Kazumasa Takada, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/156,898

(22) Filed: Jan. 25, 2021

(51) Int. Cl.

| | |
|---|---|
| ***G03G 15/04*** | (2006.01) |
| ***G06K 15/00*** | (2006.01) |
| ***G03G 15/043*** | (2006.01) |
| ***G06K 15/12*** | (2006.01) |

(52) U.S. Cl.

CPC ....... *G03G 15/043* (2013.01); *G06K 15/1209* (2013.01); *G06K 15/1219* (2013.01); *G03G 15/04072* (2013.01); *G03G 2215/0404* (2013.01)

(58) Field of Classification Search

CPC ........... G03G 15/043; G03G 15/04072; G03G 2215/0404; B41J 2/442; G06K 15/1209; G06K 15/1219

USPC .......... 399/51, 220; 347/235, 236, 246, 250, 347/253

See application file for complete search history.

(56) References Cited

U.S. PATENT DOCUMENTS 5,264,871 A * 11/1993 Tsukada ............. G06K 15/1209 347/131
7,045,771 B2 * 5/2006 Ishikawa ............ G06K 15/1214 250/234
7,432,943 B2 * 10/2008 Hamada ............. G03G 15/5008 347/235
8,878,886 B2 * 11/2014 Nito ......................... B41J 2/473 347/236
2009/0190944 A1 * 7/2009 Okada ................ G06K 15/1214 399/51
2010/0189453 A1 7/2010 Ogasahara (Continued)

FOREIGN PATENT DOCUMENTS

JP 2001-037268 A 2/2001
JP 2001-272898 A 10/2001
JP 2001-282052 A 10/2001

*Primary Examiner* — Robert B Beatty

(74) *Attorney, Agent, or Firm* — Foley & Lardner LLP

(57) ABSTRACT

According to one embodiment, an image forming apparatus includes a rotatable photoconductor, a laser light source configured to output a laser beam according to an image, a polygon mirror positioned to reflect the laser beam while rotating and cause the laser beam to be incident on the photoconductor along a main scanning direction to form an electrostatic latent image, a photodetector configured to detect the laser beam reflected by the polygon mirror, a developer, a transfer mechanism, and a processor. The processor (a) controls the laser light source such that a light emission intensity of the laser light source is constant when the laser beam is incident on the photodetector, regardless of a rotation speed of the polygon mirror and (b) controls the output timing of the laser beam based on a detection result of the photodetector.

15 Claims, 4 Drawing Sheets

81 51 MAIN SCANNING DIRECTION 81
FIRST SYSTEM
BD SIGNAL
MAIN SCANNING COUNTER 0 1 2 3 4 5 6 7 n 0 1
CORRECTION SIGNAL
AT NORMAL SPEED
LIGHT EMISSION INTENSITY
AT DECELERATION
IMAGE DATA AREA
t0 t1 t2 t3 t4 t5 t6 t7 t8 t9

81 51 MAIN SCANNING DIRECTION 81
SECOND SYSTEM
BD SIGNAL
MAIN SCANNING COUNTER 0 1 2 3 4 5 6 7 n 0 1
CORRECTION SIGNAL
AT NORMAL SPEED
LIGHT EMISSION INTENSITY
AT DECELERATION
IMAGE DATA AREA
t1 t11 t12 t13 t14 t15 t16 t17 t18 t19 t20
TIME[sec]

(56) References Cited

U.S. PATENT DOCUMENTS

2014/0362154 A1* 12/2014 Takezawa ............ G03G 15/043
347/118
2015/0338769 A1* 11/2015 Koga ..................... G03G 21/14
347/118
2019/0039385 A1* 2/2019 Nakano .............. H04N 1/02481

* cited by examiner 43
44
81
81
81
81
82
83
83
51
51
51
51
63
63
63
63
61
62
64
MAIN SCANNING DIRECTION
MAIN SCANNING DIRECTION
MAIN SCANNING DIRECTION
MAIN SCANNING DIRECTION
CONVEYANCE DIRECTION (SUB-SCANNING DIRECTION)

43
87
13
SYSTEM CONTROLLER
84
FIRST DIGITAL-TO-ANALOG CONVERTER
90
DRIVE CIRCUIT
81
LASER LIGHT SOURCE
89
VOLTAGE SHIFT CIRCUIT
83
PHOTODETECTOR
85
SECOND DIGITAL-TO-ANALOG CONVERTER
88
86
LIGHT EMISSION INTENSITY CORRECTION CIRCUIT
EXPOSURE DEVICE

IMAGE FORMING APPARATUS WITH VARIABLE LIGHT EMISSION INTENTSITY AND COMPUTER-READABLE NONVOLATILE RECORDING MEDIUM THEREFOR

FIELD

Embodiments described herein relate generally to an image forming apparatus and a computer-readable non-volatile recording medium with a control program recorded thereon.

BACKGROUND

An image forming apparatus includes a process unit, an exposure device, a transfer mechanism, a fixing device, and the like for each color. The process unit includes a photoconductor and a developing device. The image forming apparatus irradiates a charged and rotating photoconductor with a laser beam from an exposure device based on an image to form an electrostatic latent image on the photoconductor. Using a developing device, the image forming apparatus makes toner adhere to the electrostatic latent image on the photoconductor to form a toner image on the photoconductor. Using a transfer mechanism, the image forming apparatus transfers the toner image from the photoconductor to a recording medium such as paper. Using a fixing device, the image forming apparatus fixes the toner image transferred to the recording medium.

The exposure device is, for example, an exposure device of an electrophotographic type using a laser scanning unit (LSU). The exposure device includes a laser light source for each color, a polygon mirror, a plurality of optical members, and a photodetector. The laser light source outputs a laser beam. The polygon mirror includes a plurality of reflecting surfaces that reflect the laser beam output from the laser light source and rotates at a predetermined speed. The plurality of optical members make the laser beam reflected by the reflecting surface of the polygon mirror incident onto the photoconductor. The photodetector detects the laser beam output from the laser light source and reflected by the polygon mirror.

According to such a configuration, the laser beam output from the laser light source is reflected by the reflecting surface of the rotating polygon mirror, so that an advancing direction changes with time. Therefore, the laser beam output from the laser light source is scanned on the photoconductor in a main scanning direction. The image forming apparatus controls the output timing of the laser beam by the laser light source based on the timing when the laser beam is detected by the photodetector.

Since the time required for fixing differs depending on the heat capacity of the recording medium, the image formation speed (i.e., the printing speed) differs depending on the recording medium. For example, when the printing speed becomes slow, the rotation speed of the polygon mirror and the rotation speed of the photoconductor also become slow. As described above, when the printing speed becomes slow and the rotation speed of the polygon mirror and the rotation speed of the photoconductor also become slow, the time for the laser beam to be incident on the photoconductor becomes long. For example, when the light emission intensity of the laser beam from the laser light source is the same and the time for the laser beam to be incident on the photoconductor is long, the density of the toner image formed on the recording medium becomes high. Therefore, when the printing speed is slowed down, the image forming apparatus reduces the light intensity of the laser beam output from the laser light source and suppresses a change in the density of the toner image.

However, when the light intensity of the laser beam output from the laser light source changes, the time from when the laser beam is incident on the photodetector to when the photodetector outputs a signal indicating that the laser beam is detected changes. As a result, there is a problem that a deviation in positions where the toner image is formed between different colors on an image carrier of the transfer mechanism may occur.

DETAILED DESCRIPTION

In general, according to one embodiment, an image forming apparatus includes a rotatable photoconductor, a laser light source configured to output a laser beam according to an image, a polygon mirror positioned to reflect the laser beam while rotating and cause the laser beam to be incident on the photoconductor along a main scanning direction to form an electrostatic latent image, a photodetector configured to detect the laser beam reflected by the polygon mirror, a developer, a transfer mechanism, and a processor. The processor controls the laser light source such that the light emission intensity of the laser light source is constant when the laser beam is incident on the photodetector, regardless of the rotation speed of the polygon mirror and controls an output timing of the laser beam source based on a detection result of the photodetector.

Figure 1:
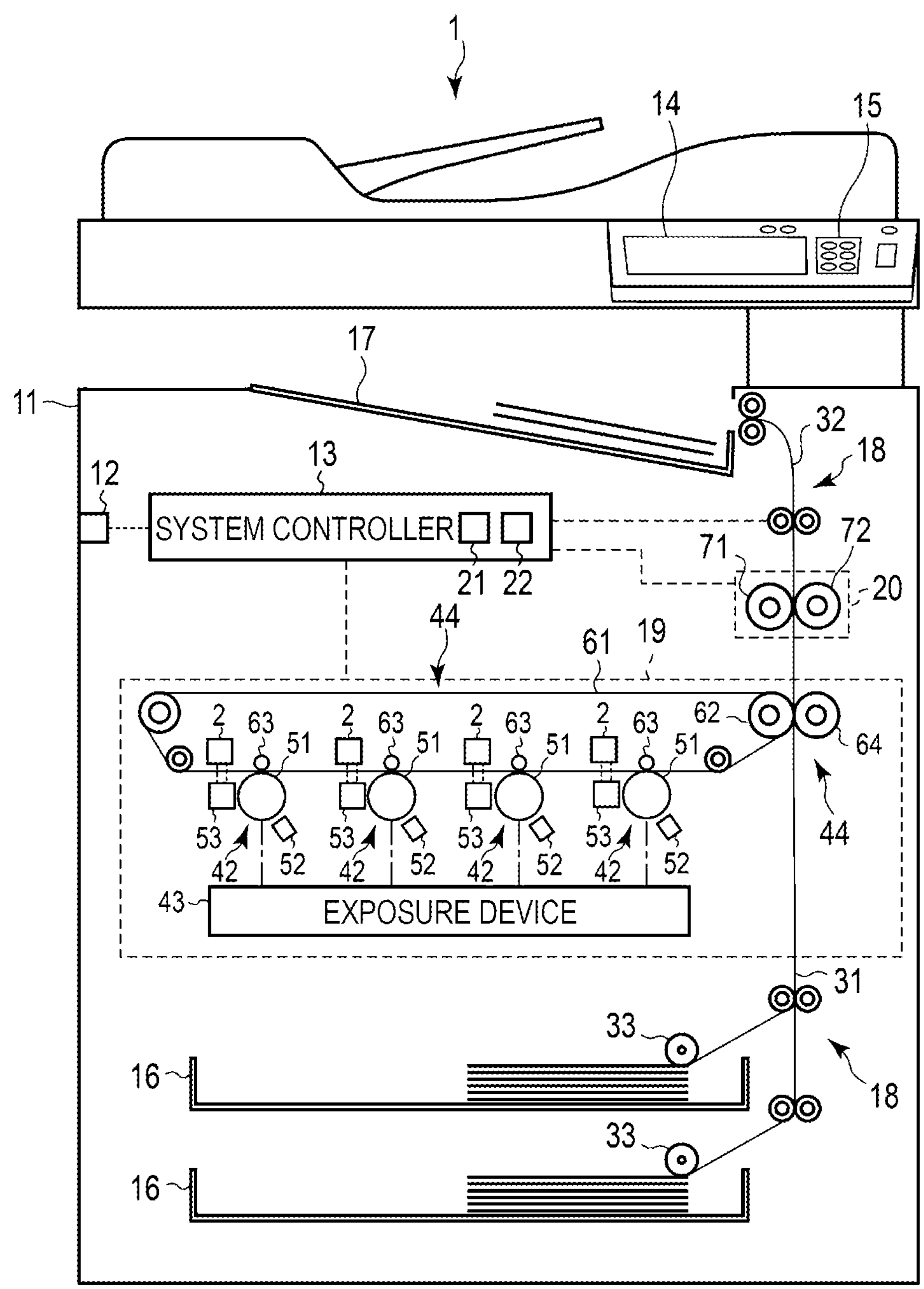
FIG. 1 is a diagram illustrating a configuration example of an image forming apparatus according to an embodiment.

Hereinafter, an image forming apparatus according to an embodiment and a computer-readable non-volatile recording medium on which a control program is recorded will be described with reference to the accompanying drawings. FIG. 1 is an explanatory diagram illustrating a configuration example of an image forming apparatus 1 according to the embodiment.

The image forming apparatus 1 is, for example, a multi-function printer (MFP) that performs various processing such as image forming while conveying a recording medium. The image forming apparatus 1 has a configuration in which an image is formed on a recording medium by using toner replenished from a toner cartridge.

For example, the image forming apparatus 1 has a configuration in which toner is received from a toner cartridge 2 and an image is formed on a recording medium by the received toner. The image forming apparatus 1 receives toner from each of a plurality of toner cartridges 2 holding toners of different colors such as cyan, magenta, yellow, and black, and forms a toner image.

As illustrated in FIG. 1, the image forming apparatus 1 includes a housing 11, a communication interface 12, a system controller 13, a display unit 14, an operation interface 15, a sheet feed cassette 16, a sheet discharge tray 17, a conveyance mechanism 18, an image forming unit 19, and a fixing device 20.

The housing 11 is a main body of the image forming apparatus 1. The housing 11 accommodates the communication interface 12, the system controller 13, the display unit 14, the operation interface 15, the sheet feed cassette 16, the sheet discharge tray 17, the conveyance mechanism 18, the image forming unit 19, and the fixing device 20.

The communication interface 12 is an interface that relays communication with other devices. The communication interface 12 is used, for example, for communication with a client. The client is, for example, an information processing device such as a personal computer, a smartphone, or a tablet PC. The communication interface 12 is configured as, for example, a LAN connector or the like. The communication interface 12 may be configured to perform wireless communication with the client according to a standard such as Bluetooth (registered trademark) or Wi-Fi (registered trademark).

The system controller 13 controls the image forming apparatus 1. The system controller 13 includes, for example, a processor 21 and a memory 22.

The processor 21 is an operational element that executes operational processing. The processor 21 is, for example, a CPU. The processor 21 may include a single processor or multiple processors working simultaneously or separately from one another. The processor 21 performs various processing based on data such as a program stored in the memory 22. The processor 21 functions as a control unit capable of executing various operations by executing the program stored in the memory 22.

The memory 22 is a storage medium for storing a program and data used in the program. The memory 22 also functions as a working memory. That is, the memory 22 temporarily stores data being processed by the processor 21, the program executed by the processor 21, and the like.

The processor 21 performs various information processing by executing the program stored in the memory 22. For example, the processor 21 controls data transmission and reception by the communication interface 12, screen display by the display unit 14, operation input by the operation interface 15, conveyance of the recording medium by the conveyance mechanism 18, image forming processing by the image forming unit 19, and fixing processing by the fixing device 20, and the like. The processor 21 generates a print job based on an image acquired from an external device via the communication interface 12. The processor 21 stores the generated print job in the memory 22.

The print job includes image data indicating an image to be formed on the recording medium. The image data may be data for forming an image on one recording medium or may be data for forming images on a plurality of recording media. Furthermore, the print job may contain information indicating whether printing is color printing or monochrome printing.

The display unit 14 includes a display that displays a screen according to an input video signal. For example, the display of the display unit 14 displays a screen and the like for various settings of the image forming apparatus 1.

The operation interface 15 includes an operation member that generates an operation signal based on a user's operation.

The sheet feed cassette 16 is a cassette that accommodates recording media. The sheet feed cassette 16 is configured so that the recording medium can be supplied from the outside of the housing 11. For example, the sheet feed cassette 16 is configured to be drawable outward from the housing 11.

The sheet discharge tray 17 is a tray that supports the recording medium discharged from the image forming apparatus 1.

The conveyance mechanism 18 is configured to supply a recording medium for printing to the image forming unit 19 and discharge the recording medium on which an image is formed by the image forming unit 19 from the housing. For example, the conveyance unit 18 includes a sheet feed conveyance path 31 and a sheet discharge conveyance path 32.

The sheet feed conveyance path 31 and the sheet discharge conveyance path 32 move the recording medium, respectively.

The sheet feed conveyance path 31 takes in the recording medium from the sheet feed cassette 16 and supplies the taken-in recording medium to the image forming unit 19. The sheet feed conveyance path 31 includes a pickup roller 33 corresponding to each sheet feed cassette 16. Each pickup roller 33 takes in the recording medium of the sheet feed cassette 16 into the sheet feed conveyance path 31.

The sheet discharge conveyance path 32 is a conveyance path for discharging the recording medium on which the image is formed from the housing 11. The recording medium discharged via the sheet discharge conveyance path 32 is supported by the output tray 17.

Next, the image forming unit 19 will be described. The image forming unit 19 is configured to form an image on the recording medium. Specifically, the image forming unit 19 forms the image on the recording medium based on the print job generated by the processor 21.

The image forming unit 19 includes a plurality of process units 42, an exposure device 43, and a transfer mechanism 44. The image forming unit 19 is configured so that the toner cartridge 2 can be attached to each process unit 42.

Next, the plurality of process units 42 will be described. The process units 42 are configured to form a toner image. For example, one process unit 42 is provided for each type of toner. For example, the plurality of process units 42 each correspond to color toners such as cyan, magenta, yellow, and black, respectively. Specifically, each of the toner cartridges 2 having toners of different colors is connected to each process unit 42. Since each of the plurality of process units 42 has the same configuration, one process unit 42 will be described as an example.

Each process unit 42 includes a photosensitive drum 51 (e.g., a roller), a charger 52, and a developing device 53 (e.g., a developer, a toner supply, a carrier supply, a developer supply, etc.). The photosensitive drum 51 is a photoconductor including a cylindrical drum and a photoreceptive layer formed on the outer peripheral surface of the drum. The photosensitive drum 51 rotates at a constant speed.

The charger 52 uniformly charges the surface of the photosensitive drum 51. For example, the charger 52 uses a charging roller to apply a voltage to the photosensitive drum 51 to charge the photosensitive drum 51 to a uniform negative electrode potential.

The developing device 53 is a device that makes toner adhere to the photosensitive drum. The developing device 53 includes a developer container, a stirring mechanism, a developing roller, a doctor blade, and the like.

The developer container is a container that receives and contains the toner sent out from the toner cartridge 2. The carrier is contained in advance in the developer container. The toner sent out from the toner cartridge 2 is stirred with the carrier by the stirring mechanism to form a developer in which the toner and the carrier are mixed. The carrier is contained in the developer container, for example, at the time of manufacturing the developing device 53.

The developing roller rotates in the developer container to make the developer adhere to the surface thereof. The doctor blade is a member disposed at a predetermined interval from the surface of the developing roller. The doctor blade removes a part of the developer adhering to the surface of the rotating developing roller. Therefore, a layer of the developer having a thickness corresponding to the interval between the doctor blade and the surface of the developing roller is formed on the surface of the developing roller.

Next, the exposure device 43 will be described (e.g., an exposure light source). The exposure device 43 is, for example, an exposure device of an electrophotographic type using a laser scanning unit (LSU). The exposure device 43 outputs a laser beam according to an image to be printed and irradiates the charged photosensitive drum 51 of each process unit 42 with the laser beam. The exposure device 43 scans the laser beam in the main scanning direction, which is a direction parallel to a rotation axis of the photosensitive drum 51. Therefore, the exposure device 43 forms an electrostatic latent image for one line on the photosensitive drum 51. The exposure device 43 continuously irradiates the rotating photosensitive drum 51 with light to form a plurality of lines of electrostatic latent images on the photosensitive drum 51. In this state, when the layer of the developer formed on the surface of the developing roller of the developing device 53 is close to the surface of the photosensitive drum 51, the toner contained in the developer adheres to the electrostatic latent image formed on the surface of the photosensitive drum 51. Thus, a toner image is formed on the surface of the photosensitive drum 51. The detailed configuration of the exposure device 43 will be described later.

Next, the transfer mechanism 44 (e.g., a transfer assembly) will be described. The transfer mechanism 44 has a configuration in which the toner image formed on the surface of the photosensitive drum 51 is transferred to the recording medium. The transfer mechanism 44 includes, for example, a primary transfer belt 61 (e.g., a transfer element, an image carrier), a secondary transfer counter roller 62, a plurality of primary transfer rollers 63, and a secondary transfer roller 64.

The primary transfer belt 61 is an endless belt wound around the secondary transfer counter roller 62 and a plurality of winding rollers. In the primary transfer belt 61, an inner peripheral surface, which is an inner surface thereof, contacts the secondary transfer counter roller 62 and the plurality of winding rollers, and an outer peripheral surface, which is an outer surface thereof, faces the photosensitive drum 51 of the process unit 42.

The secondary transfer counter roller 62 rotates to convey the primary transfer belt 61 in a predetermined conveyance direction. The plurality of winding rollers are configured to be freely rotatable. The plurality of winding rollers rotate according to the movement of the primary transfer belt 61 by the secondary transfer counter roller 62.

The plurality of primary transfer rollers 63 are configured to bring the primary transfer belt 61 into contact with the plurality of photosensitive drums 51 of the plurality of process units 42, respectively. The plurality of primary transfer rollers 63 are provided so as to correspond to the photosensitive drums 51 of the plurality of process units 42. Specifically, the plurality of primary transfer rollers 63 are provided at positions facing the corresponding photosensitive drums 51 of the process units 42, respectively, with the primary transfer belt 61 interposed therebetween. The primary transfer roller 63 comes into contact with the inner peripheral surface side of the primary transfer belt 61 and displaces the primary transfer belt 61 toward the photosensitive drum 51. Thus, the primary transfer roller 63 brings the outer peripheral surface of the primary transfer belt 61 into contact with the photosensitive drum 51.

The secondary transfer roller 64 is provided at a position facing the primary transfer belt 61. The secondary transfer roller 64 comes into contact with the outer peripheral surface of the primary transfer belt 61 and applies pressure thereto. Therefore, a transfer nip in which the secondary transfer roller 64 and the outer peripheral surface of the primary transfer belt 61 are in close contact with each other is formed. When the recording medium passes through the transfer nip, the secondary transfer roller 64 presses the recording medium passing through the transfer nip against the outer peripheral surface of the primary transfer belt 61.

The secondary transfer roller 64 and the secondary transfer counter roller 62 rotate to convey the recording medium supplied from the sheet feed cassette 16 by a conveyance mechanism 65 in a state of pinching the recording medium. Thus, the recording medium passes through the transfer nip.

In the configuration described above, when the outer peripheral surface of the primary transfer belt 61 comes into contact with the photosensitive drum 51, the toner image formed on the surface of the photosensitive drum 51 is transferred to the outer peripheral surface of the primary transfer belt 61. When the image forming unit 19 includes the plurality of process units 42, the primary transfer belt 61 receives a toner image from the photosensitive drums 51 of the plurality of process units 42. The toner image transferred to the outer peripheral surface of the primary transfer belt 61 is conveyed by the primary transfer belt 61 to the transfer nip in which the secondary transfer roller 64 and the outer peripheral surface of the primary transfer belt 61 are in close contact with each other. When a recording medium is present in the transfer nip, the toner image transferred to the outer peripheral surface of the primary transfer belt 61 is transferred to the recording medium in the transfer nip.

Next, a configuration related to the fixing of the image forming apparatus 1 will be described. The fixing device 20 melts the toner transferred to the recording medium and fixes the toner image. The fixing device 20 operates under the control of the system controller 13. The fixing device 20 includes a heating member that applies heat to the recording medium and a pressurizing member that applies pressure to the recording medium. For example, the heating member is a heat roller 71. For example, the pressurizing member is a press roller 72.

The heat roller 71 is a rotating body for fixing that rotates. The heat roller 71 includes a core metal formed of metal in a hollow shape and an elastic layer formed on the outer periphery of the core metal. The heat roller 71 is heated to a high temperature by a heater disposed inside the core metal formed in a hollow shape. The heater is, for example, a halogen heater. The heater may be an induction heating (IH) heater that heats the core metal by electromagnetic induction.

The press roller 72 is provided at a position facing the heat roller 71. The press roller 72 includes a core metal formed of a metal having a predetermined outer diameter and an elastic layer formed on the outer periphery of the core metal. The press roller 72 applies pressure to the heat roller 71. By applying pressure from the press roller 72 to the heat roller 71, a fixing nip in which the press roller 72 and the heat roller 71 are in close contact with each other is formed. The press roller 72 rotates to move the recording medium that entered the fixing nip and presses the recording medium against the heat roller 71.

With the configuration described above, the heat roller 71 and the press roller 72 apply heat and pressure to the recording medium passing through the fixing nip. Thus, the toner image is fixed on the recording medium that passes through the fixing nip. The recording medium that passed through the fixing nip is subsequently discharged to the outside of the housing 11 by the conveyance mechanism 18. The fixing device 20 is not limited to the configuration described above. The fixing device 20 may be configured with an on-demand method in which heat is applied to a recording medium on which a toner image is transferred via a film-like member to melt and fix the toner.

Figure 2:
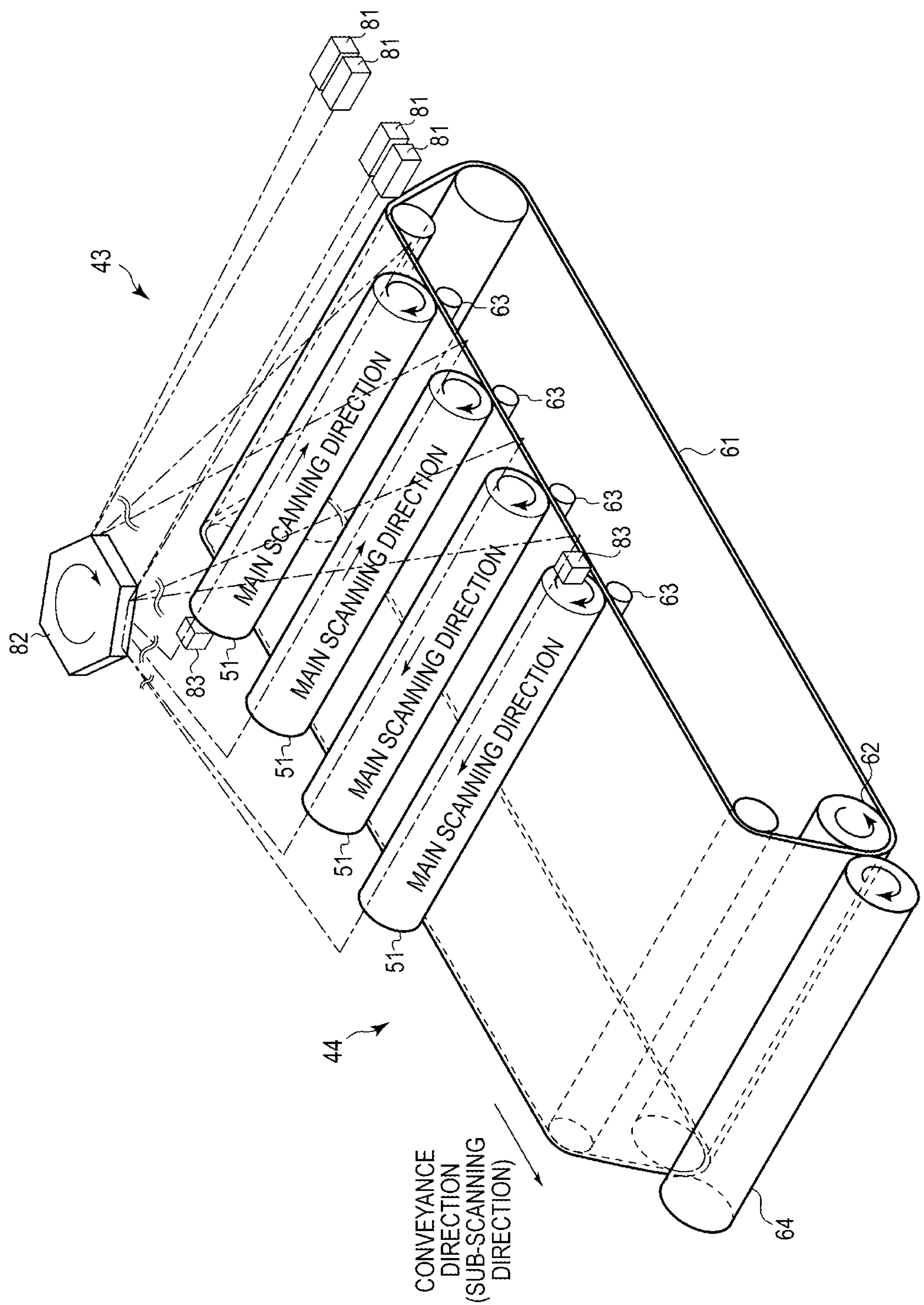
FIG. 2 is a diagram illustrating a configuration example of an exposure device of the image forming apparatus.
Figure 3:
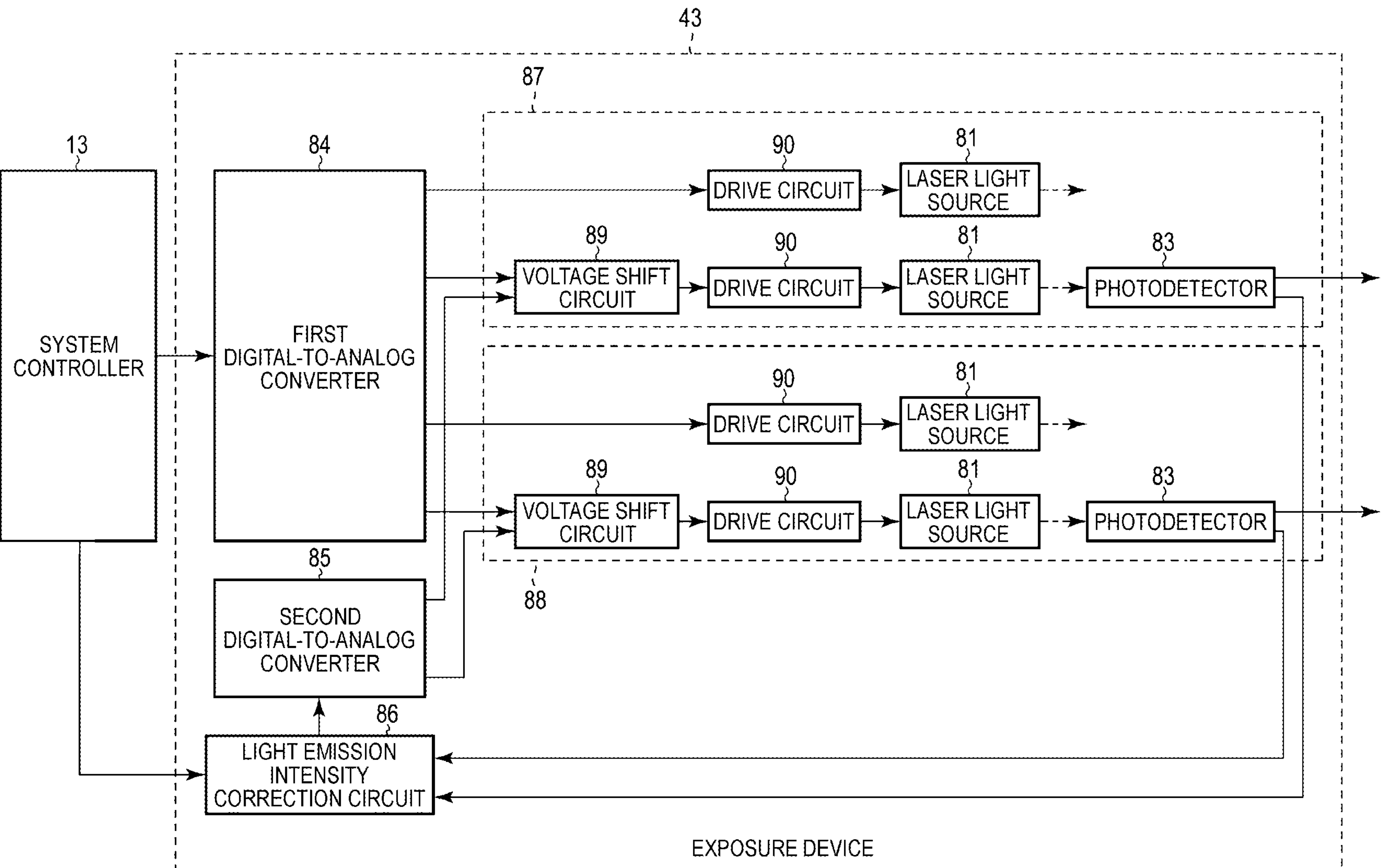
FIG. 3 is a diagram illustrating a configuration example of the exposure device of the image forming apparatus.

Next, the configuration of the exposure device 43 will be described in detail. FIG. 2 is an explanatory diagram illustrating a positional relationship of the exposure device 43 with respect to the photosensitive drum 51. FIG. 3 is a block diagram describing the configuration of the exposure device 43. In this embodiment, the exposure device 43 will be described as having a configuration in which the exposure device 43 corresponds to (e.g., includes) a laser scanning unit (LSU), and optical members for scanning are disposed on both sides of a polygon mirror as a center.

As illustrated in FIG. 2, the exposure device 43 includes a laser light source 81 for each color, a polygon mirror 82, a plurality of optical members, and a plurality of photodetectors 83. As illustrated in FIG. 3, the exposure device 43 includes a first digital-to-analog converter 84, a second digital-to-analog converter 85, a light emission intensity correction circuit 86, a first system 87, and a second system 88.

The first system 87 and the second system 88 each include a voltage shift circuit 89, a plurality of drive circuits 90, a plurality of laser light sources 81, and one photodetector 83, respectively.

As illustrated in FIG. 2, in the exposure device 43, the photosensitive drum 51 of each process unit 42 is disposed at a position facing the primary transfer roller 63 via the primary transfer belt 61 (i.e., with the primary transfer belt 61 extending between the photosensitive drum 51 and the primary transfer roller 63). In the example of FIG. 2, the process unit 42 corresponding to cyan, the process unit 42 corresponding to magenta, the process unit 42 corresponding to yellow, and the process unit 42 corresponding to black are disposed in order of far distance from the transfer nip. The exposure device 43 scans the laser beam along the main scanning direction (e.g., a longitudinal direction, an axial direction, etc.) on the photosensitive drum 51 of each process unit 42.

The laser light source 81 is a light source that outputs a laser beam. The laser light source 81 is, for example, a laser diode. One laser light source 81 is provided for each process unit 42, for example. That is, one laser light source 81 may be provided for each color such as cyan, magenta, yellow, and black. Each laser light source 81 emits light and receives electric power for light emission supplied from the drive circuit 90.

The polygon mirror 82 is a rotating multifaceted mirror that has a plurality of reflecting surfaces (e.g., facets, flat surfaces, etc.) that reflect the laser beam output from the laser light source 81 and rotates at a constant speed. The reflecting surface is provided so that an angle of the laser beam with respect to an incident direction changes according to the rotation of the polygon mirror 82. The polygon mirror 82 changes the advancing direction of the laser beam over time by reflecting the laser beam output from each laser light source 81 off of the reflecting surface while rotating at a constant speed controlled by a drive mechanism. Thus, the polygon mirror 82 polarizes and scans the laser beam output from each laser light source 81 in the main scanning direction on the photosensitive drum 51 of each process unit 42.

The optical member is a light guide member that causes the laser beam reflected by the reflecting surface of the polygon mirror 82 to be incident on the photosensitive drum 51. The optical member is, for example, a reflecting mirror and a scanning lens provided for each process unit 42. That is, the optical member is provided for each color such as cyan, magenta, yellow, and black.

The optical member corresponding to cyan makes the laser beam, which is output from the laser light source 81 corresponding to cyan and reflected by the polygon mirror 82, incident on the photosensitive drum 51 of the process unit 42 corresponding to cyan. The optical member corresponding to magenta makes the laser beam, which is output from the laser light source 81 corresponding to magenta and reflected by the polygon mirror 82, incident on the photosensitive drum 51 of the process unit 42 corresponding to magenta. The optical member corresponding to yellow makes the laser beam, which is output from the laser light source 81 corresponding to yellow and reflected by the polygon mirror 82, incident on the photosensitive drum 51 of the process unit 42 corresponding to yellow. The optical member corresponding to black makes the laser beam, which is output from the laser light source 81 corresponding to black and reflected by the polygon mirror 82, incident on the photosensitive drum 51 of the process unit 42 corresponding to black.

The photodetector 83 is a beam detector or beam detection sensor (BD sensor) that detects the laser beam output from the laser light source 81 and reflected by the polygon mirror 82. The photodetector 83 includes, for example, a photodiode, a phototransistor, or an element that generates an electrical signal in response to light. When the photodetector 83 detects the laser beam, the photodetector 83 outputs a beam detect signal (BD signal).

The photodetector 83 is disposed on an optical path of the laser beam reflected by the polygon mirror 82. The photodetector 83 is disposed, for example, on an extension line of the main scanning direction on the photosensitive drum 51. That is, the photodetector detects the laser beam on the extension line in the main scanning direction on the photosensitive drum 51.

The photodetector 83 is provided for each of the systems described above. That is, the photodetector 83 is provided in each of the first system 87 and the second system 88.

The processor 21 of the system controller 13 inputs image data for printing to the first digital-to-analog converter 84. The processor 21 of the system controller 13 inputs data for adjusting the laser power light emission intensity, which instructs a light emission intensity of the laser beam, to the first digital-analog converter 84.

The first digital-to-analog converter 84 is a circuit that converts the image data for printing input from the system controller 13 into an image signal that is an analog signal for each color. The image data is data indicating the density of each color. The first digital-to-analog converter 84 converts the image data into an image signal for each color such as cyan, magenta, yellow, and black, and outputs the image signal.

The first digital-to-analog converter 84 converts the data for adjusting the laser power light emission intensity, which is input from the system controller 13, into a signal for adjusting the laser power light emission intensity, which is an analog signal.

The second digital-to-analog converter 85 is a circuit that converts correction data input from the light emission intensity correction circuit 86 into a correction signal that is an analog signal. The second digital-to-analog converter 85 outputs the correction signal to each voltage shift circuit 89 described later.

The light emission intensity correction circuit 86 is a circuit that generates correction data for correcting the light emission intensity of the laser light source 81. The light emission intensity correction circuit 86 generates and outputs correction data based on a detection result of the laser beam by the photodetector 83. The light emission intensity correction circuit 86 generates correction data based on the timing when the laser beam is detected by the photodetector 83.

The voltage shift circuit 89 is a circuit that shifts and outputs a voltage value of the input signal for adjusting the laser power light emission intensity. The voltage shift circuit 89 shifts the voltage value of the signal for adjusting the laser power light emission intensity output from the first digital-to-analog converter 84 based on the correction signal output from the second digital-to-analog converter 85.

The voltage shift circuit 89 is provided for each of the systems described above. That is, the voltage shift circuit 89 is provided in each of the first system 87 and the second system 88. For example, the voltage shift circuit 89 is provided to correspond to the photodetector 83.

The drive circuit 90 is a lighting circuit that causes the laser light source 81 to emit light according to the input image signal and signal for adjusting the laser power light emission intensity. Each of the plurality of drive circuits 90 is provided so as to correspond to each laser light source 81. That is, the drive circuit 90 is provided for each color such as cyan, magenta, yellow, and black. A light emission amount of the laser light source 81 increases or decreases according to the voltage value of the input signal for adjusting the laser power light emission intensity. The light emission time of the laser light source 81 increases or decreases according to the input image signal. Specifically, each drive circuit 90 causes the laser light source 81 to emit light by supplying electric power for light emission to the corresponding laser light source 81.

Next, the disposition of each configuration in the first system 87 and the second system 88 will be described. As described above, the plurality of laser light sources 81, the plurality of optical members, the plurality of photodetectors 83, the voltage shift circuit 89, and the drive circuit 90 are classified into the first system 87 and the second system 88. For example, a description will be made that cyan and magenta are classified in the first line 87 and yellow and black are classified in the second line 88.

In this case, the first system 87 includes the laser light source 81, the optical member, and the drive circuit 90 that correspond to cyan. The first system 87 includes the laser light source 81, the optical member, and the drive circuit 90 that correspond to magenta. Further, the first system 87 includes the photodetector 83 and the voltage shift circuit 89.

The photodetector 83 of the first system 87 is disposed at a position on the extension line of the main scanning direction on the photosensitive drum 51 corresponding to cyan or magenta, where the laser beam is incident before the photosensitive drum 51. In this example, it is assumed that the photodetector 83 of the first system 87 is disposed on the extension line in the main scanning direction on the photosensitive drum 51 corresponding to cyan. That is, the photodetector 83 of the first system 87 detects the laser beam and outputs a BD signal at a timing, specifically a predetermined time before the laser beam is incident on the photosensitive drum 51 of cyan.

The voltage shift circuit 89 of the first system 87 shifts the voltage value of the signal for adjusting the laser power light emission intensity input to the drive circuit 90 corresponding to cyan in the first system 87 based on the correction signal output from the second digital-to-analog converter 85. That is, the voltage shift circuit 89 of the first system 87 changes the light emission intensity of the laser light source 81 of cyan that outputs the laser beam to be incident on the photodetector 83 of the first system 87 based on the correction signal output from the second digital-to-analog converter 85.

The second system 88 includes the laser light source 81, the optical member, and the drive circuit 90 that correspond to yellow. The second system 88 includes the laser light source 81, the optical member, and the drive circuit 90 that correspond to black. The second system 88 includes the photodetector 83 and the voltage shift circuit 89.

The laser light source 81 of the second system 88 is disposed so that the laser beam is incident on a position different from that of the laser light source 81 of the first system 87. That is, the laser light source 81 of the second system 88 is disposed so that the laser beam is incident on a reflecting surface different from the reflecting surface of the polygon mirror 82 on which the laser beam from the laser light source 81 of the first system 87 is incident when the laser light source 81 of the second system 88 outputs the laser beam at the same time as the laser light source 81 of the first system 87.

The photodetector 83 of the second system 88 is disposed at a position on an extension line of the main scanning direction on the photosensitive drum 51 corresponding to yellow or black, where the laser beam is incident before the photosensitive drum 51. In this example, it is assumed that the photodetector 83 of the second system 88 is disposed on the extension line in the main scanning direction on the photosensitive drum 51 corresponding to black. That is, the photodetector 83 of the second system 88 detects the laser beam and outputs a BD signal at a timing, a predetermined time before when the laser beam is incident on the photosensitive drum 51 of black.

The voltage shift circuit 89 of the second system 88 shifts the voltage value of the signal for adjusting the laser power light emission intensity input to the drive circuit 90 corresponding to black in the second system 88 based on the correction signal output from the second digital-to-analog converter 85. That is, the voltage shift circuit 89 of the second system 88 changes the light emission intensity of the laser light source 81 of black that outputs the laser beam to be incident on the photodetector 83 of the second system 88 based on the correction signal output from the second digital-to-analog converter 85.

Any combination classified into the first system 87 and the second system 88 may be used. For example, each component may be disposed so that the first system 87 corresponds to one color and the second system 88 corresponds to three colors.

Next, the operation of the exposure device 43 will be described. In the configuration described above, the system controller 13 inputs the image data to the first digital-to-analog converter 84 of the exposure device 43. The first digital-to-analog converter 84 converts the input image data into an image signal for each color and outputs the image signal. The image signal output from the first digital-to-analog converter 84 is input to the drive circuit 90 for each color directly or via the voltage shift circuit 89. The drive circuit 90 outputs the laser beam from the laser light source 81 based on the input image signal.

Since the laser beam output from each laser light source 81 is reflected by the reflecting surface of the rotating polygon mirror 82, the advancing direction of the laser beam changes with time. Each laser beam reflected by the polygon mirror 82 is polarized and scanned along the main scanning direction of the corresponding photosensitive drum 51. That is, the laser beam output from the laser light source 81 is irradiated along the main scanning direction over the entire region on the corresponding photosensitive drum 51. When the photodetector 83 is provided, the laser beam output from the laser light source 81 is incident on the photodetector 83 a predetermined time before the laser beam is incident on the photosensitive drum 51. As a result, the BD signal is output from the photodetector 83. The BD signal output from the photodetector 83 is input to the system controller 13.

The processor 21 of the system controller 13 determines an image data area based on the BD signal output from the photodetector 83. For example, the processor 21 generates a main scanning counter based on the BD signal and determines a predetermined position on the main scanning counter, that is, a predetermined count range of the main scanning counter as the image data area.

The main scanning counter indicates the position where the laser beam is irradiated in the main scanning direction.

The image data area is a region for forming an electrostatic latent image based on the image data on the photosensitive drum 51. That is, the image data area indicates an exposure start position and an exposure end position. The exposure start position is the timing when the irradiation of the laser beam based on image data is started. The exposure end position is the timing when the irradiation of the laser beam based on the image data is ended.

That is, the processor 21 generates the main scanning counter based on the BD signal, determines a predetermined position on the main scanning counter as the exposure start position, and determines another position on the main scanning counter as the exposure end position.

The processor 21 inputs the image data to the exposure device 43 from the exposure start position to the exposure end position so that the laser beam corresponding to the image data is output from the laser light source 81. For example, the processor 21 inputs image data for one line to the exposure device 43 from the exposure start position to the exposure end position.

The processor 21 inputs predetermined image data to the exposure device 43 from the exposure end position to the exposure start position so that the laser beam is continuously output from the laser light source 81.

Further, it is assumed that the rotation of the polygon mirror 82 further progresses and the laser beam output from the laser light source 81 is incident on the next reflecting surface of the polygon mirror 82. In this case, the advancing direction of the laser beam reflected by the polygon mirror 82 is irradiated from the photodetector 83 over the entire region of the photosensitive drum 51 along the main scanning direction.

Furthermore, when the BD signal is output from the photodetector 83, the processor 21 generates the main scanning counter again and determines the exposure start position and the exposure end position. Therefore, the processor 21 determines the timing of inputting the image data for the next one line to the exposure device 43. That is, each time the BD signal is output, the processor 21 inputs image data line by line to the exposure device 43.

The processor 21 of the system controller 13 controls the input timing of image data used for light emission of the laser light source 81 of the first system 87 based on the BD signal from the photodetector 83 of the first system 87. That is, the processor 21 outputs image data used for light emission of the laser light source 81 corresponding to cyan and magenta based on the BD signal from the photodetector 83 of the first system 87.

The processor 21 of the system controller 13 controls the input timing of the image data used for the light emission of the laser light source 81 of the second system 88 based on the BD signal from the photodetector 83 of the second system 88. That is, the processor 21 outputs image data used for light emission of the laser light source 81 corresponding to yellow and black based on the BD signal from the photodetector 83 of the second system 88.

The light emission intensity correction circuit 86 determines the timing for correcting the light emission intensity in the laser light source 81 based on the BD signal output from the photodetector 83 and the control signal from the system controller 13. That is, the light emission intensity correction circuit 86 determines the timing when the laser beam is allowed to be incident on the photodetector 83 based on the BD signal. The light emission intensity correction circuit 86 generates and outputs correction data so that the light emission intensity of the laser light source 81 at the timing when the laser beam is incident on the photodetector 83 becomes constant.

The light emission intensity correction circuit 86 determines the timing for correcting the light emission intensity of the laser light source 81 of the first system 87 based on the BD signal from the photodetector 83 of the first system 87. The light emission intensity correction circuit 86 determines the timing for correcting the light emission intensity of the laser light source 81 of the second system 88 based on the BD signal from the photodetector 83 of the second system 88.

Next, the relationship between the heat capacity of the recording medium and the printing speed will be described. Since the time required for fixing differs depending on the heat capacity of the recording medium, the system controller 13 forms an image at a different printing speed depending on the recording medium. Therefore, the system controller 13 changes the speed at which the recording medium is conveyed, the moving speed of the primary transfer belt 61, the rotation speed of the photosensitive drum 51, and the rotation speed of the polygon mirror 82 according to the printing speed.

For example, when the rotation speed of the polygon mirror 82 is a first speed, the system controller 13 controls the rotation speed of the photosensitive drum 51 to a third speed. When the rotation speed of the polygon mirror 82 is a second speed slower than the first speed, the system controller 13 controls the rotation speed of the photosensitive drum 51 to a fourth speed slower than the third speed.

For example, when the printing speed becomes slow, the rotation speed of the photosensitive drum 51 and the polygon mirror 82 also becomes slow. For example, when the printing speed is "normal speed", the system controller 13 controls the rotation speed of the polygon mirror 82 to the first speed and controls the rotation speed of the photosensitive drum 51 to the third speed. For example, when the printing speed is "deceleration", the system controller 13 controls the rotation speed of the polygon mirror 82 to the second speed and the rotation speed of the photosensitive drum 51 to the fourth speed. As described above, when the rotation speed of the photosensitive drum 51 and the polygon mirror 82 becomes slow, the time for the laser beam to be incident on the photosensitive drum 51 becomes long (i.e., increases). For example, when the light emission intensity of the laser beam from the exposure device 43 is the same and the time for the laser beam to be incident on the photosensitive drum 51 is long, the density of the toner image formed on the recording medium becomes high.

Therefore, when the printing speed is the "normal speed", the rotation speed of the polygon mirror 82 is the first speed, and the rotation speed of the photosensitive drum 51 is the third speed, the processor 21 of the system controller 13 controls the exposure device 43 so as to output the laser beam with a first light emission intensity. That is, when the printing speed is the "normal speed", the processor 21 sets a set value of the light emission intensity to the first light emission intensity.

When the printing speed is the "deceleration", the rotation speed of the polygon mirror 82 is the second speed, and the rotation speed of the photosensitive drum 51 is the fourth speed, the processor 21 of the system controller 13 controls the exposure device 43 so as to output the laser beam with a second light emission intensity weaker than the first light emission intensity. That is, when the printing speed is the "deceleration", the processor 21 sets the set value of the light emission intensity to the second light emission intensity.

The processor 21 inputs a control signal indicating whether the printing speed is the normal speed or the deceleration to the light emission intensity correction circuit 86 of the exposure device 43.

The light emission intensity correction circuit 86 switches whether to correct the light emission intensity based on whether the printing speed instructed by the system controller 13 is the "normal speed" or the "deceleration". For example, when the printing speed instructed by the system controller 13 is the "normal speed", the light emission intensity correction circuit 86 does not correct the light emission intensity of the laser beam incident on the photodetector 83. When the printing speed instructed by the system controller 13 is the "deceleration", the light emission intensity correction circuit 86 corrects the light emission intensity of the laser beam incident on the photodetector 83.

Figure 4:
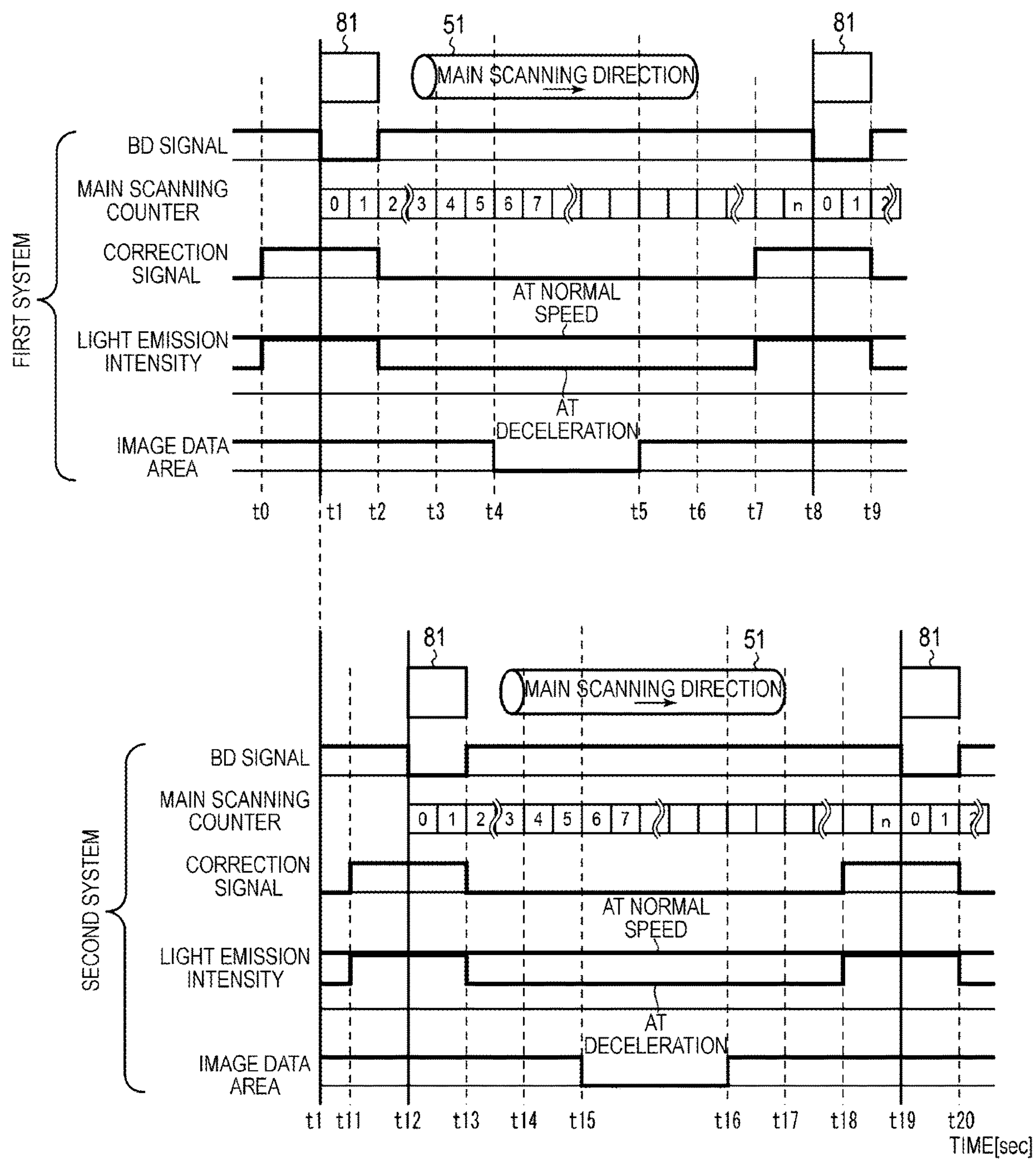
FIG. 4 is an explanatory diagram illustrating an example of the control of the exposure device of the image forming apparatus.

FIG. 4 is a timing chart for describing the control of the exposure device 43. FIG. 4 illustrates the control of the first system 87 and the control of the second system 88. The horizontal axis of FIG. 4 represents the time, and the vertical axis represents the BD signal, the main scanning counter, the correction signal, the light emission intensity, and the image data area, respectively.

Since the control of the first system 87 and the control of the second system 88 are the same except for the difference in the control timing according to the difference in the position of the photosensitive drum 51 in the sub-scanning direction, the first system 87 will be described as an example.

In the example of the first system 87 in FIG. 4, the laser beam is detected by the photodetector 83 at timing t1. Therefore, the BD signal is at an L level which is ON from timing t1 to timing t2. It is assumed that the photosensitive drum 51 is irradiated with the laser beam from timing t3 to timing t6.

The processor 21 of the system controller 13 generates the main scanning counter based on the timing when the BD signal is turned ON. In the example of FIG. 4, the main scanning counter is generated with timing t1 as a reference.

At timing t8, the laser beam is detected again by the photodetector 83. Therefore, the BD signal is turned on from timing t8 to timing t9. Further, the BD signal is at an H level which is OFF from timing t2 to timing t8.

The processor 21 generates a main scanning counter based on the timing when the BD signal is turned ON again. In the example of FIG. 4, the main scanning counter is generated with timing t8 as a reference.

The processor 21 determines the image data area based on the main scanning counter which is generated based on the BD signal. That is, the processor 21 determines the exposure start position at which the output of the laser beam based on the image data is started and the exposure end position at which the output of the laser beam based on the image data is ended. In the example of FIG. 4, the processor 21 determines that timing t4 is the exposure start position, and timing t5 is the exposure end position.

The light emission intensity correction circuit 86 outputs correction data based on the timing when the BD signal is turned ON. The correction data is converted into a correction signal by the second digital-to-analog converter 85. As described above, the correction signal is a signal for shifting the light emission intensity of the laser beam from the laser light source 81. The light emission intensity correction circuit 86 outputs correction data so as to increase the light emission intensity at least while the laser beam is incident on the photodetector 83.

In the example of FIG. 4, the light emission intensity correction circuit 86 outputs the correction data so as to increase the light emission intensity from timing to, a predetermined time before when the laser beam is incident on the photodetector 83, to timing t2 when the incidence of the laser beam on the photodetector 83 ends.

The light emission intensity correction circuit 86 determines the timing when the laser beam is allowed to be incident on the photodetector 83 in the first system 87 based on the BD signal from the photodetector 83 of the first system 87. That is, the light emission intensity correction circuit 86 calculates the next timing when the laser beam is allowed to be incident on the photodetector 83 of the first system 87 based on the timing when the BD signal was output from the photodetector 83 of the first system 87 previously.

The light emission intensity correction circuit 86 does not output correction data when the printing speed is the "normal speed". In this case, the laser beam having the first light emission intensity is output from the laser light source 81 of the first system 87 and the laser beam is incident on the photodetector 83 of the first system 87. Therefore, when the printing speed is the "normal speed", the laser beam having the first light emission intensity is continuously output from the laser light source 81.

The light emission intensity correction circuit 86 outputs the correction data when the printing speed is the "deceleration". In this case, the correction data is output so as to output the laser beam with the first light emission intensity at the timing when the laser beam from the laser light source 81 of the first system 87 is incident on the photodetector 83.

The second digital-to-analog converter 85 converts the correction data into an analog correction signal and inputs the analog correction signal to the voltage shift circuit 89 of the first system 87. Therefore, the voltage value of the signal for adjusting the laser power light emission intensity input to the laser light source 81 of the first system 87 is raised by the voltage shift circuit 89. As a result, at the timing when the laser beam is incident on the photodetector 83, the laser beam having the first light emission intensity is output from the laser light source 81 of the first system 87 and the laser beam is incident on the photodetector 83 of the first system 87. That is, the light emission intensity correction circuit 86 increases the light emission intensity from the second light emission intensity to the first emission intensity from timing to, a predetermined time before when the laser beam is incident on the photodetector 83, to timing t2 when the incidence of the laser beam to the photodetector 83 ends. The light emission intensity correction circuit 86 increases the light emission intensity from the second light emission intensity to the first emission intensity from timing t7, a predetermined time before the laser beam is incident on the photodetector 83 again, to timing t9 when the incidence of the laser beam on the photodetector 83 ends.

As described above, when the exposure device 43 can output the laser beam with the first light emission intensity and the second light emission intensity weaker than the first light emission intensity, the emission intensity correction circuit 86 controls so that the laser beam is incident on the photodetector 83 with a stronger light emission intensity. As a result, the exposure device 43 controls the laser light source 81 so that the light emission intensity at the timing when the laser beam is incident on the photodetector 83 is constant regardless of the printing speed.

The image forming apparatus 1 described above includes the rotating photosensitive drum 51, the exposure device 43, the developing device 53, the transfer mechanism 44, and the system controller 13. The exposure device 43 includes the laser light source 81 that outputs the laser beam according to an image, the polygon mirror 82, and the photodetector 83 that detects the laser beam reflected by the polygon mirror 82. The polygon mirror 82 reflects the laser beam while rotating, and causes the laser beam to be incident on the photosensitive drum 51 along the main scanning direction to form an electrostatic latent image. The system controller 13 controls the rotation speeds of the polygon mirror 82 and the photosensitive drum 51 and the light emission of the laser light source 81. The system controller 13 controls the laser light source 81 so that the light emission intensity of the laser light source 81 at the timing when the laser beam is incident on the photodetector 83 is constant regardless of the rotation speed (e.g., of the polygon mirror 82, of the photosensitive drum 51). The system controller 13 controls the output timing of the laser beam according to the image in the laser light source 81 based on the detection result of the photodetector 83.

According to the configuration described above, the light emission intensity of the laser beam incident on the photodetector 83 is always the first light emission intensity regardless of whether the printing speed is the "normal speed" or the "deceleration". Therefore, it is possible to prevent the time from when the laser beam is incident on the photodetector 83 to when the photodetector 83 outputs a BD signal indicating that the laser light is detected from being changed by the light emission intensity of the laser beam. As a result, the occurrence of a deviation in the positions where the toner image is formed between different colors can be prevented on the image carrier of the transfer mechanism.

In the embodiment described above, the system controller 13 inputs image data line by line to the exposure device 43, but is not limited to this configuration. When the exposure device 43 includes a register for inputting the input image data line by line to the first digital-analog converter 84, the system controller 13 may input image data for a plurality of lines to the exposure device 43. In addition to the exposure device 43, the image forming apparatus 1 may be provided with a controller for the exposure device 43 that inputs image data line by line to the first digital-to-analog converter 84 based on the main scanning counter and the BD signal.

In the embodiment described above, the exposure device 43 includes the first digital-to-analog converter 84, the second digital-to-analog converter 85, and the light emission intensity correction circuit 86 but is not limited to this configuration. The first digital-to-analog converter 84, the second digital-to-analog converter 85, and the light emission intensity correction circuit 86 may be provided in the system controller 13.

The image forming apparatus 1 may be provided with a controller for the exposure device 43 including a configuration related to the control of the exposure device 43 of the system controller 13, the first digital-to-analog converter 84, the second digital-to-analog converter 85, and the light emission intensity correction circuit 86.

The functions described in each of the embodiments described above are not limited to being configured by using hardware and can also be realized by using software and allowing a program describing each function to be read into a computer. In addition, each function may be configured by appropriately selecting either software or hardware.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:

a rotatable photoconductor;

a laser light source configured to output a laser beam based on an image;

a polygon mirror positioned to reflect the laser beam while rotating and cause the laser beam to be incident on the photoconductor along a main scanning direction to form an electrostatic latent image;

a photodetector configured to detect the laser beam reflected by the polygon mirror;

a developer configured to cause toner to adhere to the electrostatic latent image on the photoconductor to form a toner image;

a transfer mechanism configured to transfer the toner image to an image carrier; and a processor configured to:

set a light emission intensity of the laser light source to be a first light emission intensity when a rotation speed of the polygon mirror is a first speed;

set the light emission intensity of the laser light source to be a second light emission intensity that is weaker than the first light emission intensity when the rotation speed of the polygon mirror is a second speed that is slower than the first speed;

if the second speed is set, correct from the second light emission intensity to the first light emission intensity during a period when the laser beam is incident on the photodetector and control the light emission intensity of the laser light source to be the first emission intensity; and control an output timing of the laser beam set to the second light emission intensity based on a detection result of the photodetector.

2. The image forming apparatus of claim 1, wherein a first system corresponding to a first surface of the polygon mirror and a second system corresponding to a second surface of the polygon mirror, wherein each of the first and second systems includes at least one of the photoconductor, the developer, the laser light source, or the photodetector, and the processor is configured to:

control the light emission of the laser light source of the first system based on the detection result of the photodetector of the first system; and control the light emission of the laser light source of the second system based on the detection result of the photodetector of the second system.

3. The image forming apparatus of claim 2, wherein the processor is configured to:

control the output timing of the laser beam of the laser light source of the first system based on the detection result of the photodetector of the first system; and control the output timing of the laser beam of the laser light source of the second system based on the detection result of the photodetector of the second system.

4. The image forming apparatus of claim 2, wherein the first system includes:

a plurality of the photoconductors;

a plurality of the developers, each corresponding to one of the photoconductors of the first system;

a plurality of the laser light sources, each corresponding to one of the photoconductors of the first system; and at least one of the photodetectors, and the second system includes:

a plurality of the photoconductors;

a plurality of the developers, each corresponding to one of the photoconductors of the second system;

a plurality of the laser light sources, each corresponding to one of the photoconductors of the second system; and at least one of the photodetectors.

5. The image forming apparatus of claim 2, wherein the first system includes one of the photoconductors, one of the developers, one of the laser light sources, and one of the photodetectors, and the second system includes:

a plurality of the photoconductors;

a plurality of the developers, each corresponding to one of the photoconductors of the second system;

a plurality of the laser light sources, each corresponding to one of the photoconductors of the second system; and at least one of the photodetectors.

6. The image forming apparatus of claim 1, wherein the photodetector is positioned to detect the laser beam from the laser light source along an extension line extending in the main scanning direction.

7. The image forming apparatus of claim 6, wherein the processor is configured to control a subsequent timing when the laser beam is incident on the photoconductor based on the detection result of the photodetector.

8. The image forming apparatus of claim 1, wherein the processor is configured to control the light emission intensity of the laser light source when the laser beam is incident on the photodetector based on a timing when the photodetector previously detected the laser beam.

9. The image forming apparatus of claim 1, wherein the processor is configured to:

control a rotation speed of the photoconductor to be a third speed when the rotation speed of the polygon mirror is a first speed; and control the rotation speed of the photoconductor to be a fourth speed that is slower than the third speed when the rotation speed of the polygon mirror is a second speed that is slower than the first speed.

10. A computer-readable non-volatile recording medium for an image forming apparatus, the image forming apparatus including a rotatable photoconductor, a laser light source configured to output a laser beam according to an image, a polygon mirror positioned to reflect the laser beam while rotating and cause the laser beam to be incident on the photoconductor along a main scanning direction to form an electrostatic latent image, a photodetector configured to detect the laser beam reflected by the polygon mirror, a developer configured to cause toner to adhere to the electrostatic latent image on the photoconductor to form a toner image, and a transfer mechanism configured to transfer the toner image to an image carrier, the computer-readable non-volatile recording medium including instructions stored thereon that when processed by at least one processor cause the image forming apparatus to perform operations comprising:

setting a light emission intensity of the laser light source to be a first light emission intensity when a rotation speed of the polygon mirror is a first speed;

setting the light emission intensity of the laser light source to be a second light emission intensity that is weaker than the first light emission intensity when the rotation speed of the polygon mirror is a second speed that is slower than the first speed;

if the second speed is set, correcting from the second light emission intensity to the first light emission intensity during a period when the laser beam is incident on the photodetector and control the light emission intensity of the laser light source to be the first emission intensity; and controlling an output timing of the laser beam set to the second light emission intensity based on a detection result of the photodetector.

11. The computer-readable non-volatile recording medium of claim 10, wherein the instructions cause the image forming apparatus to perform operations comprising:

controlling a subsequent timing when the laser beam is incident on the photoconductor based on the detection result of the photodetector.

12. The computer-readable non-volatile recording medium of claim 10, wherein the instructions cause the image forming apparatus to perform operations comprising:

controlling the light emission intensity of the laser light source when the laser beam is incident on the photodetector based on a timing when the photodetector previously detected the laser beam.

13. The computer-readable non-volatile recording medium of claim 10, wherein the instructions cause the image forming apparatus to perform operations comprising:

controlling a rotation speed of the photoconductor to be a third speed when the rotation speed of the polygon mirror is a first speed; and controlling the rotation speed of the photoconductor to be a fourth speed that is slower than the third speed when the rotation speed of the polygon mirror is a second speed that is slower than the first speed.

14. A method of forming an image on a recording medium, the method comprising:

outputting a laser beam from a light source;

reflecting, by a mirror, the laser beam onto a photoconductor that rotates;

rotating the mirror such that the laser beam is incident on the photoconductor along a main scanning direction to form an electrostatic latent image;

controlling a light emission intensity of the light source to be a first light emission intensity when a rotation speed of the mirror is a first speed and the laser beam is incident on the photoconductor;

controlling the light emission intensity of the light source to be a second light emission intensity that is weaker than the first light emission intensity when the rotation speed of the mirror is a second speed that is slower than the first speed and the laser beam is incident on the photoconductor;

correcting the light emission intensity of the light source to be the first light emission intensity when the rotation speed of the mirror is the second speed and the laser beam is incident on a photodetector;

controlling an output timing of the laser beam set to the second light emission intensity based on a detection result of the photodetector;

adhering toner to the electrostatic latent image to form a toner image;

transferring the toner image from the photoconductor to the recording medium; and fixing the toner image on the recording medium.

15. The method of claim 14, further comprising:

controlling the light emission intensity of the light source to be the first light emission intensity when the rotation speed of the mirror is the first speed and the laser beam is incident on the photodetector.

* * * * *